United States Patent
Kawano

(10) Patent No.: US 9,659,018 B2
(45) Date of Patent: May 23, 2017

(54) FILE NAME PRODUCING APPARATUS THAT PRODUCES FILE NAME OF IMAGE

(71) Applicant: Takuya Kawano, Toyokawa (JP)

(72) Inventor: Takuya Kawano, Toyokawa (JP)

(73) Assignee: KONICA MINOLTA BUSINESS TECHNOLOGIES, INC., Chiyoda-Ku, Tokyo (JP)

(*) Notice: Subject to any disclaimer, the term of this patent is extended or adjusted under 35 U.S.C. 154(b) by 439 days.

(21) Appl. No.: 13/630,280

(22) Filed: Sep. 28, 2012

(65) Prior Publication Data

US 2013/0268528 A1    Oct. 10, 2013

(30) Foreign Application Priority Data

Sep. 29, 2011    (JP) ................... 2011-214616

(51) Int. Cl.
G06F 17/30 (2006.01)
H04N 1/32 (2006.01)

(52) U.S. Cl.
CPC ... *G06F 17/30091* (2013.01); *H04N 1/32128* (2013.01); *H04N 2201/3229* (2013.01); *H04N 2201/3277* (2013.01)

(58) Field of Classification Search
None
See application file for complete search history.

(56) References Cited

U.S. PATENT DOCUMENTS

| 5,579,517 A | 11/1996 | Reynolds et al. |
| 5,627,996 A | 5/1997 | Bauer |
| 5,745,902 A | 4/1998 | Miller et al. |
| 5,748,807 A * | 5/1998 | Lopresti et al. ............... 382/310 |
| 5,832,531 A * | 11/1998 | Ayers ................. G06K 9/00463 715/209 |
| 5,987,330 A | 11/1999 | Otsuji et al. |

(Continued)

FOREIGN PATENT DOCUMENTS

| JP | 03-283766 A | 12/1991 |
| JP | H06-161855 A | 6/1994 |

(Continued)

OTHER PUBLICATIONS

"Editor functions—Text correction—OCR" website (http://subtitleproc.sourceforge.net/help/SP_E_F_Text_OCR.htm, (accessed Feb. 25, 2015 10:44:25 AM), Google indexed date of Mar. 1, 2003.*

(Continued)

*Primary Examiner* — Richard Bowen
(74) *Attorney, Agent, or Firm* — Buchanan Ingersoll & Rooney PC

(57) ABSTRACT

An MFP (Multifunction Peripheral) is a file name producing apparatus that produces a file name of an image. The MFP selects a candidate character string, which is a file name candidate and in which a head character is a space, from the character strings extracted from the image. The MFP deletes the space that is the head character of the candidate character string, or changes all the characters constituting the candidate character string to other characters. The MFP produces the character string, which is corrected by the deletion or the change, as the file name of the image. Therefore, the proper file name can be produced.

21 Claims, 8 Drawing Sheets

(56) References Cited

U.S. PATENT DOCUMENTS

| | | | |
|---|---|---|---|
| 6,011,916 A * | 1/2000 | Moore | G06F 9/4428 717/104 |
| 6,035,061 A * | 3/2000 | Katsuyama et al. | 382/177 |
| 6,338,059 B1 * | 1/2002 | Fields | G06F 17/30864 707/706 |
| 6,996,293 B1 | 2/2006 | Watanabe | |
| 7,773,822 B2 * | 8/2010 | Walker | 382/254 |
| 2003/0105589 A1 * | 6/2003 | Liu | G06F 17/30017 702/1 |
| 2005/0063009 A1 | 3/2005 | Ehara et al. | |
| 2006/0143154 A1 * | 6/2006 | Jager | 707/1 |
| 2006/0148495 A1 * | 7/2006 | Wilson | H04L 12/5855 455/466 |
| 2006/0235811 A1 * | 10/2006 | Fairweather | G06F 8/427 706/12 |
| 2006/0290789 A1 * | 12/2006 | Ketola | G06F 17/30011 348/231.99 |
| 2007/0055933 A1 * | 3/2007 | Dejean et al. | 715/533 |
| 2011/0004617 A1 | 1/2011 | Mineo | |
| 2011/0058228 A1 * | 3/2011 | Inamoto et al. | 358/448 |

FOREIGN PATENT DOCUMENTS

| | | | |
|---|---|---|---|
| JP | H06-187211 A | 7/1994 | |
| JP | H06-309207 A | 11/1994 | |
| JP | 8-315069 A | 11/1996 | |
| JP | H09-69864 A | 3/1997 | |
| JP | 11-191105 A | 7/1999 | |
| JP | 2001-061060 A | 3/2001 | |
| JP | 2005-56315 A | 3/2005 | |
| JP | 2005-311729 A | 11/2005 | |
| JP | 2008-234539 A | 10/2008 | |
| JP | 2011-013989 A | 1/2011 | |

OTHER PUBLICATIONS

Wikipedia contributors. Filename. Wikipedia, The Free Encyclopedia. Sep. 24, 2011, 11:50 UTC. Available at: https://en.wikipedia.org/w/index.php?title=Filename&oldid=681255588. Accessed Dec. 10, 2015.*

Office Action (Notice of Grounds of Rejection) issued on Nov. 19, 2013, by the Japanese Patent Office in corresponding Japanese Patent Application No. 2011-214616, and an English Translation of the Office Action. (6 pages).

Office Action (Notice of Grounds of Rejection) issued Feb. 25, 2014, by the Japan Patent Office in corresponding Japanese Patent Application No. 2011-214616, and an English Translation of the Office Action (6 pages).

* cited by examiner

FIG.4(a)

My name is KONICAMINOLTA
......
●●●●●
●●●●●
●●●●●

⇧

「□My□□name□□is
□□KONICAMINOLTA」

⇧

「My□name□is□
KONICAMINOLTA」

FIG.4(b)

My name is KONICAMINOLTA
......
●●●●●
●●●●●
●●●●●

⇧

「□My□□name□□is
□□KONICAMINOLTA」

⇧

「Mynameis
KONICAMINOLTA」

FIG.4(c)

My name is KONICAMINOLTA
......
●●●●●
●●●●●
●●●●●

⇧

「□My□□name□□is
□□KONICAMINOLTA」

⇧

「My」

DOCUMENT IMAGE         CANDIDATE CHARACTER STRING         FILE NAME

PRIOR ART

FILE NAME PRODUCING APPARATUS THAT PRODUCES FILE NAME OF IMAGE

This application is based on Japanese Patent Application No. 2011-214616 filed with the Japan Patent Office on Sep. 29, 2011, the entire content of which is hereby incorporated by reference.

BACKGROUND OF THE INVENTION

Field of the Invention

The present invention relates to a file name producing apparatus that produces a file name of an image, and more particularly to a file name producing apparatus that can produce a proper file name.

Description of the Related Art

An electrophotographic image forming apparatus includes an MFP (Multi Function Peripheral) provided with a scanner function, a facsimile function, a copying function, a function as a printer, a data communication function, and a server function, a facsimile machine, a copying machine, and a printer.

Nowadays, the image forming apparatus is widely spread in offices and homes as a scanner, a copying machine, a printer, a facsimile machine, and a digital multi function peripheral, which include image readers. Some image forming apparatuses include an ADF (Auto Document Feeder) that supplies a sequence of documents to the image reader one by one. The image forming apparatus including the ADF can automatically supply the documents including a plurality of sheets to the image reader one by one.

A file of an image (input image) of the document read with the image reader is stored in a storage unit of the image forming apparatus. In the case where a user searches the file from the storage unit after the file is stored, the user frequently determines whether the file is the file to be searched from the file name. Therefore, desirably the file name reflecting a content of the file is added in storing the file of the input image.

As to a method for adding the file name of the input image, there is a method in which the image forming apparatus automatically produces the file name. According to the method for automatically producing the file name, the user can avoid a trouble of manually producing the file name. In the method for automatically producing the file name, for example, the image forming apparatus selects one character string from a plurality of character strings, which are extracted from the input image through OCR (Optical Character Recognition) processing, and the selected character string is used as the file name of the input image. Through the OCR processing, a space between characters or character strings can be output as a space character code. For example, Documents 1 and 2 disclose technologies related to the file name producing processing and the OCR processing.

In the technology disclosed in Document 1, character recognition is performed to a given region (preset region) of the image, a size or a color of the character or the character string, which is obtained by the character recognition, is determined, and the character having a predetermined size or color is used as the file name of the image file.

In the technology disclosed in Document 2, document image data is observed in a unit of line, a range where the characters are continued between the spaces is extracted as a character phrase, a starting point, a middle point, and an ending point of the character phrase are detected in each extracted character phrase, and values of coordinates of array orders in the lines are compared and checked. In the technology disclosed in Document 2, a string of the character phrase of the array order is determined to be left-aligned when starting coordinates agree with each other within an allowable range, the string of the character phrase of the array order is determined to be centered when middle coordinates agree with each other within the allowable range, and the string of the character phrase of the array order is determined to be right-aligned when ending coordinates agree with each other within the allowable range.

[Document 1] Japanese Patent Laying-Open No. 2005-56315

[Document 2] Japanese Patent Laying-Open No. 08-315069

When the image forming apparatus performs the OCR processing, desirably the character is extracted while a layout of the input image is retained as much as possible. Therefore, in the case where the OCR processing is performed to the input image in which a distance between the characters constituting the character string is large, the image forming apparatus outputs the character string in which one or at least two spaces (space character codes) are inserted between the characters.

On the other hand, sometimes the image forming apparatus outputs the character string in which the space is inserted between the characters due to the mistaken recognition of the character string even when the distance between the characters constituting the character string is short. As a result, unfortunately the image forming apparatus inserts the unnecessary space in the file name, and therefore the file name of the input image becomes unsuitable (an unintended file name of the user).

Particularly, in the case where the character string that becomes a candidate of the file name is located in a photographic region of the input image or a shaded background, the mistaken recognition of the character string is easily generated to produce the unintended file name of the user. In order to prevent the mistaken recognition, desirably the OCR processing is not performed to the photographic region of the input image, but the OCR processing is performed only to the character region. However, in the related art, the OCR processing is also performed to the photographic region.

FIG. 8 is a view schematically illustrating the input image in which the photographic region includes the character string. In FIG. 8, almost all character strings are indicated by characters of "x" and "%".

Referring to FIG. 8, the character string exists in each region indicated by a dotted line in the photographic region. In the case where the OCR processing is performed to the character string, the image forming apparatus easily performs the mistaken recognition of the character string. Particularly, in the character string in a region A of FIG. 8, the image forming apparatus frequently recognizes a head character as the space. As a result, sometimes the character string including the unnecessary head space is produced as the file name of the input image.

SUMMARY OF THE INVENTION

An object of the present invention is to provide a file name producing apparatus that can produce a proper file name.

In accordance with one aspect of the present invention, a file name producing apparatus that produces a file name of an image, includes: a character string selector for selecting a candidate character string from character strings extracted from the image, the candidate character string becoming a file name candidate, a head character being a space in the candidate character string; a candidate character string corrector for correcting the candidate character string; and a file name producing unit for producing the character string, which is corrected by the candidate character string corrector, as the file name of the image, wherein the candidate character string corrector includes at least one of a head character string deleting unit and a character string changing unit, the head character string deleting unit deleting a space that is a head character from the candidate character string, the character string changing unit changing all characters constituting the candidate character string to other characters.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4(a) to 4(c) are views illustrating a file name producing method according to a second embodiment of the present invention.

DESCRIPTION OF THE PREFERRED EMBODIMENTS

Hereinafter, embodiments of the present invention will be described with reference to the drawings.

In the following embodiments, the file name producing apparatus is an image forming apparatus by way of example. The image forming apparatus provided with an image forming function may be an MFP, a facsimile machine, a copying machine, or a printer. Instead of the image forming apparatus, for example, the file name producing apparatus may be an apparatus, such as a scanner (image reading device), which is not provided with the image forming function.

In the following description, a space (space character code) in characters obtained through OCR processing is expressed by "☐". As used herein, the "space" means a gap that expresses separation between words or starting of a paragraph.

[First Embodiment]

Figure 1:
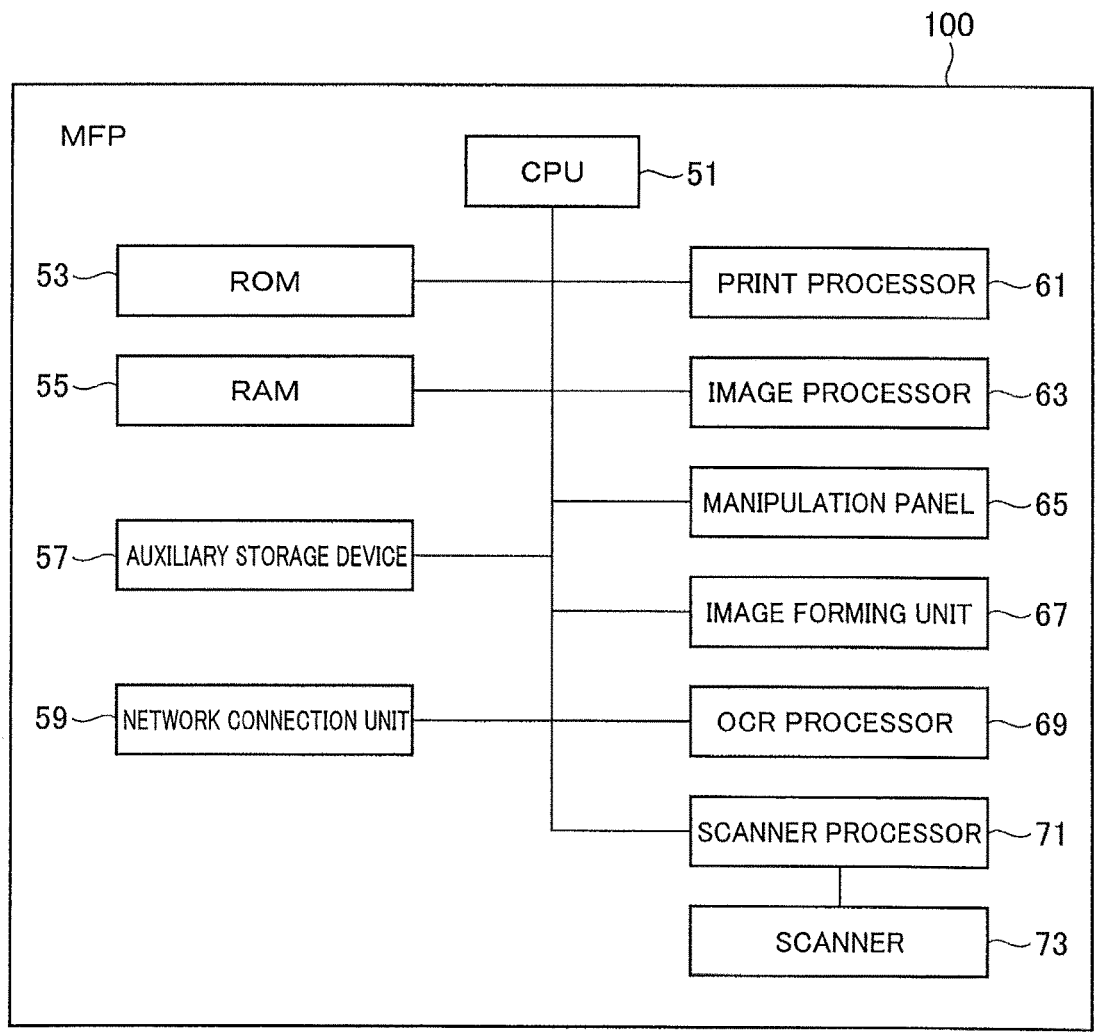
FIG. 1 is a block diagram illustrating an image forming apparatus according to a first embodiment of the present invention.

Referring to FIG. 1, an MFP 100 according to this embodiment is provided with a scanner function, a facsimile function, a copying function, a function as a printer, a data communication function, and a server function. MFP 100 includes a CPU (Central Processing Unit) 51, a ROM (Read Only Memory) 53, a RAM (Random Access Memory) 55, an auxiliary storage device 57, a network connection unit 59, a print processor 61, an image processor 63, a manipulation panel 65, an image forming unit 67, an OCR processor 69, a scanner processor 71, and a scanner 73.

CPU 51 controls the whole of MFP 100. CPU 51 is operated by executing programs, such as a file name producing program, which are stored in ROM 53.

The program operating CPU 51 is stored in ROM 53.

Data and image data, which are necessary for CPU 51 to execute the program, are temporarily stored in RAM 55.

Auxiliary storage device 57 is a region in which box data for MFP 100 is stored. For example, auxiliary storage device 57 is constructed by an HDD (Hard Disk Drive).

Network connection unit 59 conducts communication with an external device through Ethernet (registered trademark) or a USB. Network connection unit 59 uses a communication device (not illustrated) when transmitting and receiving data to and from the external device on the WWW (World Wide Web) or a network.

Print processor 61 performs print processing of a document image and additional information.

Image processor 63 performs adjustment of a character width, contrast, or a color combination of conversion of image data.

Manipulation panel 65 is a user interface that receives a user's manipulation of MFP 100 or displays various pieces of information for the user.

Image forming unit 67 mainly includes a toner image forming unit, a fixing device, and a sheet conveying unit. For example, in image forming unit 67, an image is formed on a sheet by an electrophotographic system. The toner image forming unit is configured such that four color images can be combined by what is called a tandem system to form a color image on a sheet (recording medium). The toner image forming unit includes photosensitive bodies each of which is provided for C (cyan), M (magenta), Y (yellow), and K (black), an intermediate transfer belt to which a toner image is transferred (primary transfer) from a photosensitive body, and a transfer unit that transfers (secondary transfer)) the image from the intermediate transfer belt to the sheet. The fixing device includes a heating roller and a pressurizing roller. In the fixing device, the sheet on which the toner image is formed is conveyed while nipped between the heating roller and the pressurizing roller, and the sheet is heated and pressurized. The fixing device melts the toner adhering to the sheet and fixes the toner to the sheet, thereby forming the image on the sheet. The sheet conveying unit includes a sheet feed roller, a conveying roller, and a motor that drives the sheet feed roller and the conveying roller. In the sheet conveying unit, the sheet is fed from the sheet feed cassette, and conveyed in a chassis of MFP 100. The sheet conveying unit discharges the sheet on which the image is formed from the chassis of MFP 100 to a sheet discharge tray.

OCR processor 69 extracts a character string from the image. In extracting the character string, a character string that is separated in each part of speech may be extracted, character strings in which fonts or sizes are identical to each other may be extracted as one character string, or a character string that is separated by a line feed or a punctuation may be extracted. OCR processor 69 may use a proper character string in the extracted character strings as a candidate of the file name.

Scanner processor 71 produces image data from an image (a document image or an input image) of a document read from scanner 73.

In MFP 100, for example, scanner 73 reads the image from the document, and a file of a document image is stored in a box of auxiliary storage device 57. At this point, the file name of the document image is produced by the following method. For example, MFP 100 causes OCR processor 69 to perform character recognition to the document image to extract the character string from the document image. MFP 100 selects a candidate character string, which is the candidate of the file name, from the extracted character strings. In the case where the space is a head character of the candidate character string, MFP 100 corrects the candidate character string by deleting the space that is the head character from the candidate character string, or by changing all the characters constituting the candidate character string to other characters. MFP 100 produces the corrected character string as the file name of the image. The detailed file name producing method of the first embodiment will be described below.

Figure 2:
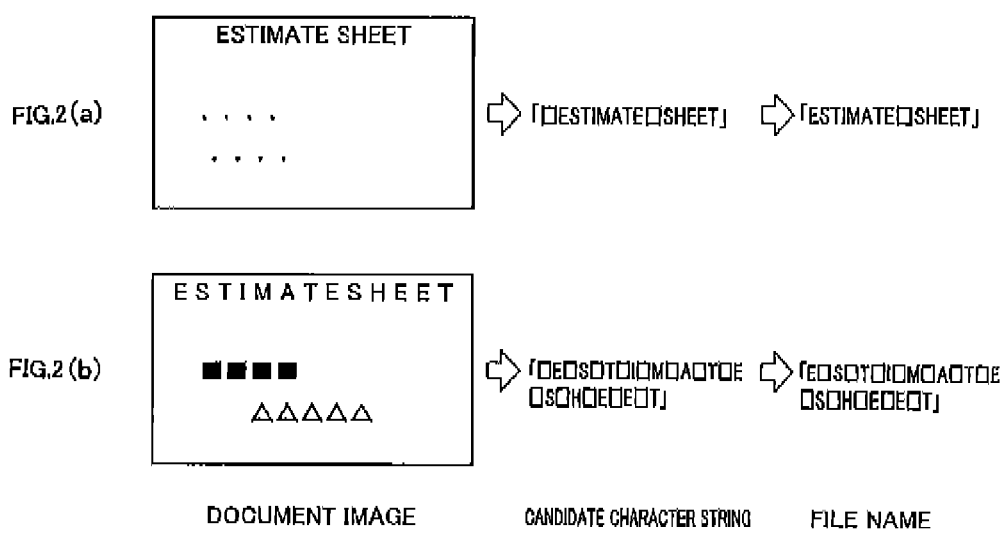
FIGS. 2(a) and 2(b) are views illustrating a file name producing method of the first embodiment.

FIGS. 2(*a*) and 2(*b*) are views illustrating the file name producing method of the first embodiment. In FIGS. 2(*a*) and 2(*b*), 4(*a*) to 4(*c*) and 6(*a*) to 6(*d*), a part of characters included in the document image is expressed by a black circle, a rectangle, or a triangle.

Referring to FIGS. 2(*a*) and 2(*b*), in the OCR processing, in the case where a blank between the characters or character strings is recognized, sometimes the blank is extracted as the space character code. In FIG. 2(*a*), the character string of "ESTIMATE SHEET" is centered in an upper portion of the document image. The left blank of the character string is extracted as the space character code through the OCR processing. As a result, the character string of "estimate sheet" in the document image is extracted as the character string of "□ESTIMATE□SHEET" through the OCR processing.

It is assumed that MFP 100 selects the character string of "□ESTIMATE□SHEET" as the candidate character string from the character strings extracted through the OCR processing. In this case, MFP 100 deletes the space that is the head character from the candidate character string, and produces the post-deletion character string of "ESTIMATE□SHEET" as the file name.

There are well known technologies of selecting the candidate character string from the character strings extracted through the OCR processing. For example, the candidate character string can be selected based on a font size, a color, or a position of the character string. It is only necessary that the candidate character string include at least one character (including a symbol and a numerical character).

In the file name producing apparatus of the related art, the character string selected as the file name from the extracted character string is directly produced as the file name without correction. However, the head space in the file name is not necessary from user's standpoint. Therefore, MFP 100 deletes the space that is the head character from the candidate character string, and produces the post-deletion character string of "estimate sheet" as the file name.

Similarly to the document image in FIG. 2(*a*), in the document image in FIG. 2(*b*), the character string of "ESTIMATE SHEET" is centered with a distance between the characters. The left blank of the character string and the blank between the characters are extracted as the space character code through the OCR processing. As a result, the centered character string of "ESTIMATE SHEET" is extracted as the character string of "□E□S□T□I□M□A□T□E□S□H□E□E□T" through the OCR processing.

It is assumed that MFP 100 selects the character string of "□E□S□T□I□M□A□T□E□S□H□E□E□T" as the candidate character string from the character strings extracted through the OCR processing. In this case, MFP 100 deletes the space that is the head character from the candidate character string, and produces the post-deletion character string of "E□S□T□I□M□A□T□E□S□H□E□E□T" as the file name.

In the case where the space is the head character of the candidate character string, MFP 100 may produce the character string except the candidate character string as the file name by changing all the characters constituting the candidate character string to other characters instead of deleting the space that is the head character from the candidate character string.

Figure 3:
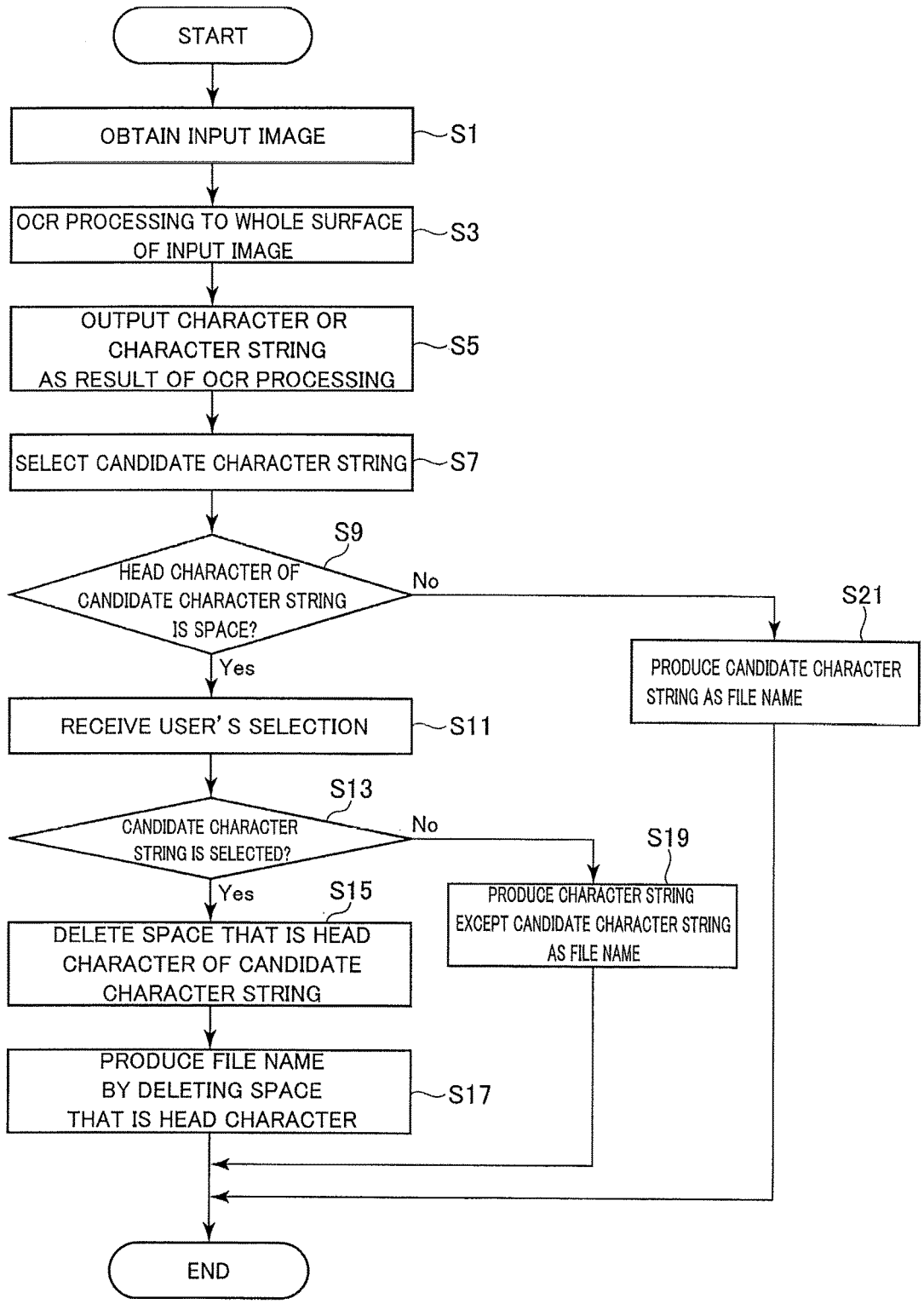
FIG. 3 is a flowchart illustrating file name producing processing performed by an MFP 100 of the first embodiment.

FIG. 3 is a flowchart illustrating file name producing processing performed by MFP 100 of the first embodiment, Referring to FIG. 3, for example, CPU 51 of MFP 100 scans the document image with scanner 73 to obtain the input image (S1). CPU 51 performs the OCR processing to a whole surface of input image (S3), and outputs the character or the character string as a result of the OCR processing (S5). CPU 51 selects the candidate character string from the extracted character or character string (S7), and determines whether the head character of the candidate character string is the space (space character code) (S9).

In step S9, when it is determined that the head character is the space (Yes in S9), CPU 51 receives user's selection which the candidate character string or the character string except the candidate character string is used as the file name (S11). CPU 51 determines whether the user selects the candidate character string as the file name (S13).

In step S13, when it is determined that the user selects the candidate character string (Yes in S13), CPU 51 corrects the candidate character string by deleting the space that is the head character of the candidate character string (S15). CPU 51 produces the post-deletion (post-correction) character string, in which the space that is the head character is deleted, as the file name (S17). Then the processing is ended.

In step S9, when it is determined that the head character is not the space (No in S9), CPU 51 directly produces the candidate character string as the file name (S21). Then the processing is ended.

In step S13, when it is determined that the user selects the character string except the candidate character string (No in S13), CPU 51 produces the character string except the candidate character string as the file name (S19). Then the processing is ended.

The user's selection in step S11 may be eliminated. In this case, the setting of which the candidate character string or the character string except the candidate character string is used as the file name may previously be stored in ROM 53.

In the case where the space is the head character of the candidate character string that becomes the candidate of the file name, probably the image forming apparatus mistakenly recognizes the character string included in the document image during the OCR processing to extract the mistakenly-recognized character string as the candidate character string, or the space is mistakenly inserted in the document image. Therefore, probably the space is not required for the file name. According to the first embodiment, the proper file name can be produced by deleting the head space of the candidate character string or by the use of the character string except the candidate character string.

[Second Embodiment]

The case where MFP 100 corrects at least two successive spaces included in the candidate character string will be described in this embodiment. Since a configuration of MFP 100 is identical to that of the first embodiment, the description is omitted.

FIGS. 4(*a*) to 4(*c*)are views illustrating a file name producing method according to a second embodiment of the present invention.

A character string of "My name is KONICAMINOLTA" is centered in an upper portion of each of the document images in FIGS. 4(*a*) to 4(*c*).

The left blank of the character string is extracted as the space character code through the OCR processing. Because of the large distance between the words in the character string, the distance between the words is extracted as the two space character codes. As a result, the character string of "☐My☐☐name☐☐is☐☐KONICAMINOLTA" is extracted.

It is assumed that MFP 100 selects the character string of "☐My☐☐name☐☐is☐☐KONICAMINOLTA" as the candidate character string from the character strings extracted through the OCR processing. In FIG. 4(*a*), after deleting the space that is the head character from the candidate character string, MFP 100 replaces at least the two successive spaces with the space of one character. As a result, MFP 100 produces the character string of "My☐name☐is☐KONICAMINOLTA" as the file name. In FIG. 4(*b*), after deleting the space that is the head character from the candidate character string, MFP 100 deletes all at least the two successive spaces. As a result, MFP 100 produces the character string of "MynameisKONICAMINOLTA" as the file name. In FIG. 4(*c*), after deleting the space that is the head character from the candidate character string, MFP 100 deletes all the character strings subsequent to at least the two successive spaces in the candidate character string. As a result, MFP 100 produces the character string of "My" as the file name.

The setting of which one of the methods in FIGS. 4(*a*) to 4(*c*) is used to correct the candidate character string is previously stored in ROM 53, and MFP 100 may decide the method for correcting at least the two successive spaces according to the setting. MFP 100 receives the setting of which one of the methods in FIGS. 4(*a*) to 4(*c*) is used to correct the candidate character string from the user, and may decide the method for correcting at least the two successive spaces according to the setting received from the user.

Figure 5:
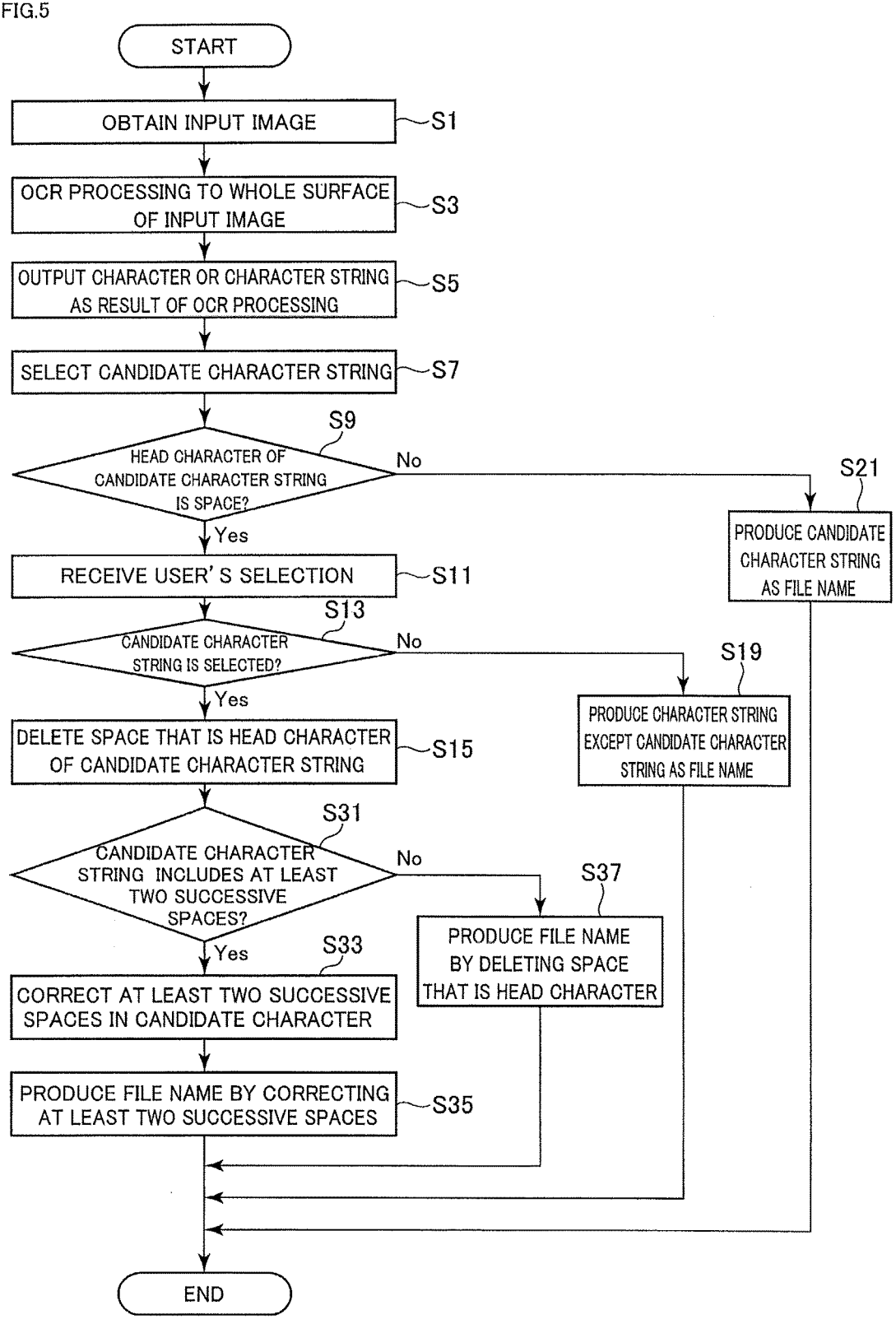
FIG. 5 is a flowchart illustrating file name producing processing performed by an MFP 100 of the second embodiment.

FIG. 5 is a flowchart illustrating file name producing processing performed by MFP 100 of the second embodiment.

The flowchart in FIG. 5 differs from the flowchart in FIG. 3 in the pieces of processing after step S15. In FIG. 5, the pieces of processing identical to those of the flowchart in FIG. 3 are omitted. After the processing in step S15, CPU 51 of MFP 100 determines whether the candidate character string includes at least the two successive spaces (S31).

In step S31, when it is determined that the candidate character string includes at least the two successive spaces (Yes in S31), CPU 51 corrects at least the two successive spaces in the candidate character string by one of the methods in FIGS. 4(*a*) to 4(*c*) (S33). CPU 51 produces the character string, in which at least the two successive spaces are already corrected, as the file name (S35). Then the processing is ended.

In step S31, when it is determined that the candidate character string does not include at least the two successive spaces (No in S31), CPU 51 produces the character string, in which at least the two successive spaces are already corrected, as the file name (S37). Then the processing is ended.

In the OCR processing, a layout of the document image is reproduced as faithfully as possible. Therefore, in the case of the large distance between the characters constituting the candidate character string, sometimes at least the two successive spaces are inserted between the characters in order to retain the layout of the document image. Probably these spaces are nor required for the file name. According to the embodiment, the proper file name can be produced by correcting at least the two successive spaces.

[Third Embodiment]

The case where MFP 100 corrects at least one of a first character string described in a first character type, a second character string described in a second character type different from the first character type, and a space between the first character string and the second character string, which are included in the candidate character string, will be described in this embodiment. Since a configuration of MFP 100 is identical to that of the first embodiment, the description is omitted.

Figure 6:
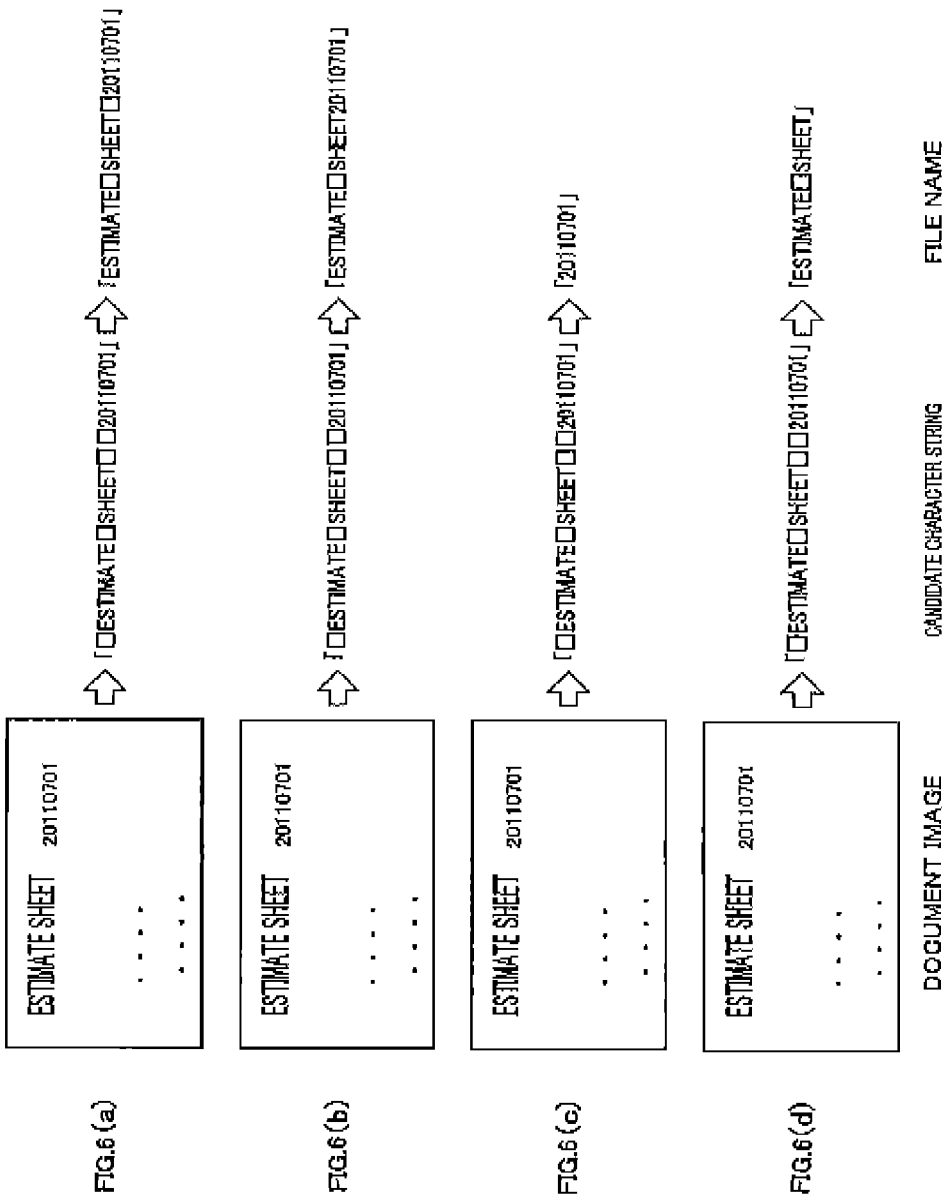
FIGS. 6(a) to 6(d) are views illustrating a file name producing method according to a third embodiment of the present invention.

FIGS. 6(*a*) to 6(*d*) are views illustrating a file name producing method according to the third embodiment of the present invention.

The first character string of "ESTIMATE SHEET" and the second character string of "20110701" are centered in an upper portion of each of the document images in FIGS. 6(*a*) to 6(*d*). The character strings are arrayed with a certain distance. The first character string and the second character string have different character types (for example, a font type, a font size, and a font color), respectively. For example, the first character string has the font size of 20 pt, and the second character string has the font size of 9 pt.

The left blank of the first character string is extracted as the space character code through the OCR processing. Because of the large distance between the first and second character strings, the distance between the character strings is extracted as the two space character codes. As a result, the first and second character strings are extracted as the character string of "☐ESTIMATE☐SHEET☐☐20110701".

It is assumed that MFP 100 selects the character string of "☐ESTIMATE☐SHEET☐☐20110701" as the candidate character string from the character strings of the document image, which are extracted through the OCR processing. In FIG. 6(*a*), after deleting the space that is the head character from the candidate character string, MFP 100 replaces at least the two successive spaces between the first and second character strings with the space of one character. As a result, MFP 100 produces the character string of "ESTIMATE☐SHEET☐20110701" as the file name. In FIG. 6(*b*), after deleting the space that is the head character from the candidate character string, MFP 100 combines the first and the second character strings by deleting all the spaces between the first and second character strings. As a result, MFP 100 produces the character string of "ESTIMATE☐SHEET20110701" as the file name. In FIG. 6(*c*), after deleting the space that is the head character from the candidate character string, MFP 100 deletes all the character strings preceding the space between the first and second character strings. As a result, MFP 100 produces the character string of "20110701" as the file name. In FIG. 6(*d*), after deleting the space that is the head character from the candidate character string, MFP 100 deletes all the character strings subsequent to the space between the first and second character strings. As a result, MFP 100 produces the character string of "ESTIMATE☐SHEET" as the file name.

In the case where the candidate character string includes the first character string, the second character string, and the space between the first and second character strings, MFP 100 may produce the character string except the candidate character string as the file name by changing all the characters constituting the candidate character string instead of correcting at least one of the first character string, the second character string, and the space between the first and the second character strings.

The setting of which one of the methods in FIGS. 6(*a*) to 6(*d*) is used to correct the candidate character string is previously stored in ROM 53, and MFP 100 may decide the method for correcting the space between the first and second character strings according to the setting. MFP 100 receives the setting of which one of the methods in FIGS. 6(*a*) to 6(*d*) is used to correct the candidate character string from the user, and MFP 100 may decide the method for correcting the space between the first and second character strings according to the setting received from the user.

Figure 7:
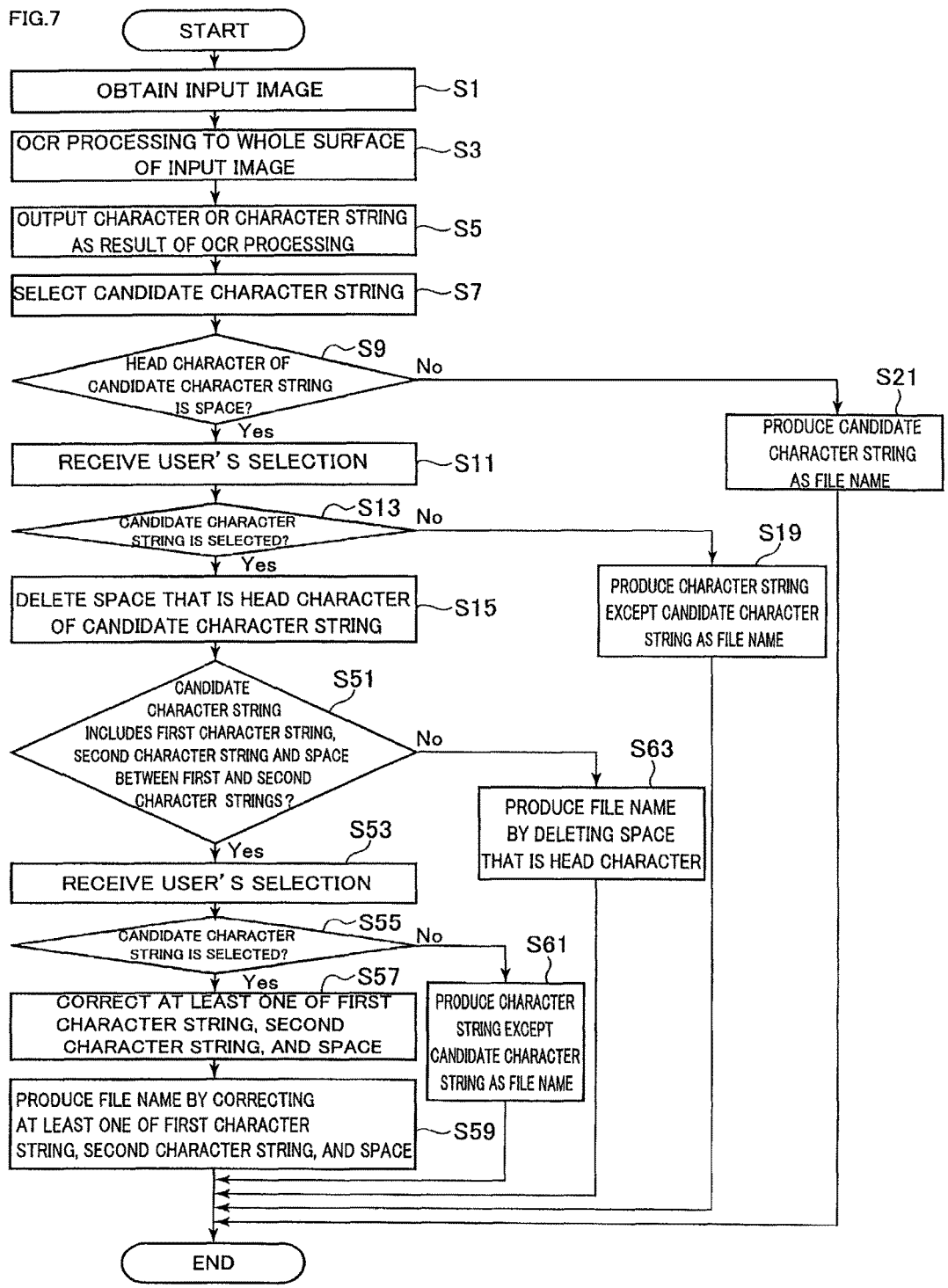
FIG. 7 is a flowchart illustrating file name producing processing performed by an MFP 100 of the third embodiment.
Figure 8:
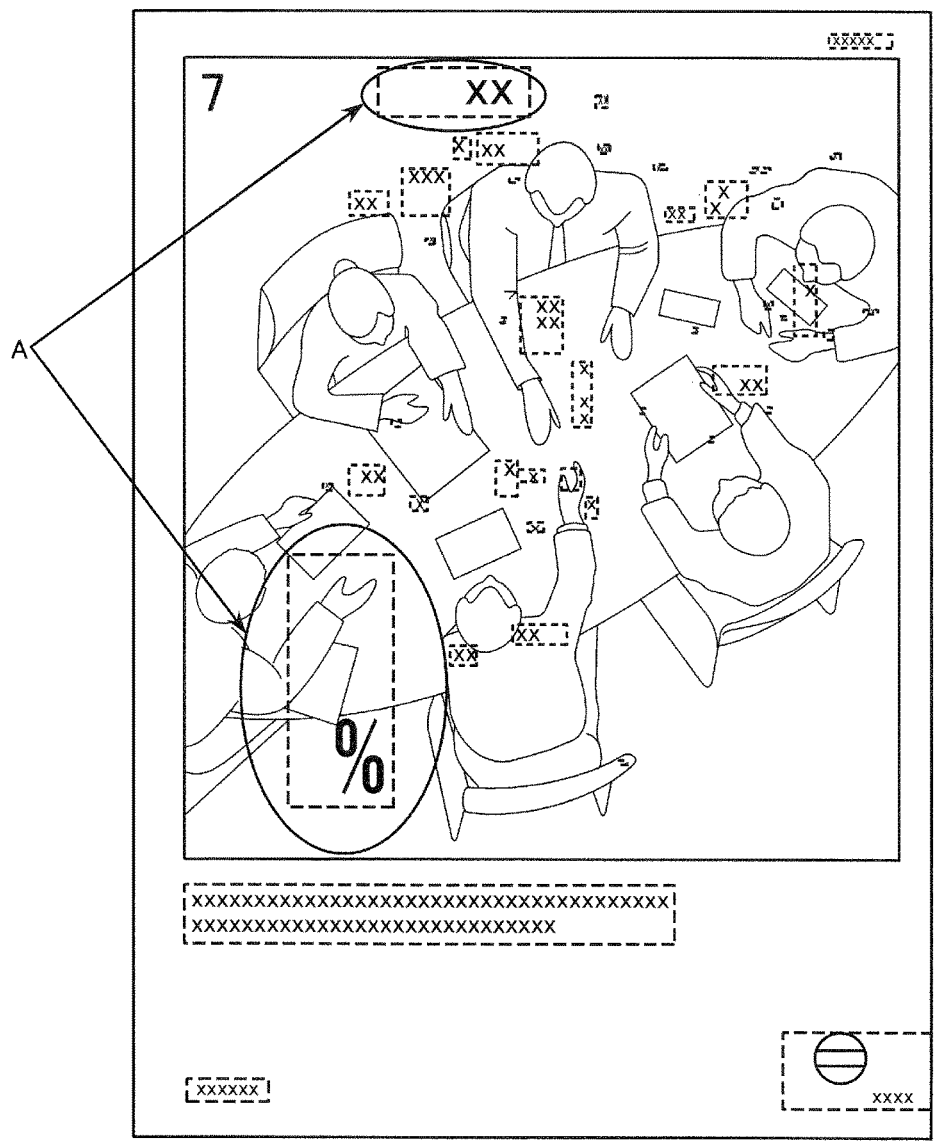
FIG. 8 is a view schematically illustrating an input image in which a character string is included in a photographic region.

FIG. 7 is a flowchart illustrating file name producing processing performed by MFP 100 of the third embodiment.

The flowchart in FIG. 7 differs from the flowchart in FIG. 3 in the pieces of processing after step S15. In FIG. 7, the pieces of processing identical to those of the flowchart in FIG. 3 are omitted. After the processing in step S15, CPU 51 of MFP 100 determines whether the candidate character string includes the first character string described in the first character type, the second character string described in the second character type different from the first character type, and the space between the first and second character strings (S51).

In step S51, when it is determined that the candidate character string includes the first character string, the second character string, and the space between the first and second character strings (Yes in S51), CPU 53 receives user's selection which the candidate character string or the character string except the candidate character string is used as the file name (S53). CPU 51 determines whether the user selects the candidate character string as the file name (S55).

In step S55, when it is determined that the user selects the candidate character string as the file name (Yes in S55), CPU 51 corrects at least one of the first character string, the second character string, and the space between the first and second character strings (S57). Then CPU 51 produces the character string, in which at least one of the first character string, the second character string, and the space between the first and second character strings is already corrected, as the file name (S59). Then the processing is ended.

In step S51, when it is determined that the candidate character string does not include the first character string, the second character string, and the space between the first and second character strings (No in S51), CPU 53 produces the character string, in which the space that is of the head character is already deleted, as the file name (S63). Then the processing is ended.

In step S55, when it is determined that the user selects the character string except the candidate character string as the file name (No in S55), CPU 51 produces the character string except the candidate character string as the file name (S61). Then the processing is ended.

In the case where the candidate character string includes the first character string described in the first character type, the second character string described in the second character type different from the first character type, and the space between the first and second character strings, probably meanings of the pieces of information indicated by the first and second character strings differ from each other. Therefore, in the case where the candidate character string is directly used as the file name, probably the candidate character string is not suitable for the file name. According to the third embodiment, the proper file name can be produced by correcting at least one of the first character string, the second character string, and the space between the first and second character strings.

According to the embodiments, the file name producing apparatus that produces the proper file name can be provided.

[Others]

In the second embodiment, MFP 100 may decide which one of the methods in FIGS. 4(*a*) to 4(*c*) is used to correct at least the two successive spaces based on the character types preceding and subsequent to at least the two successive spaces. For example, in the case where both the characters preceding and subsequent to at least the two successive spaces are alphabets, at least the two successive spaces may be replaced with one space as illustrated in FIG. 4(*a*). The space between words is important for European languages, and desirably one space is left. In the case where one of the characters preceding and subsequent to at least the two successive spaces is not the alphabet (for example, a kanji character, a katakana character, and a hiragana character), at least the two successive spaces may be deleted as illustrated in FIG. 4(*b*) or 4(*c*).

The pieces of processing of the embodiments may be performed by software or use of a hardware circuit. A program executing the pieces of processing of the embodiments may be provided, or recording mediums, such as a CD-ROM, a flexible disk, a hard disk, a ROM, a RAM, and a memory card, in which the program is recorded may be provided to the user. The program is executed by computers, such as a CPU. Alternatively, the program may be downloaded to the apparatus through communication lines, such as the Internet.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A file name producing apparatus that produces a file name of an image, the apparatus comprising a processor configured to:

extract one or more character strings from said image;

select a candidate character string from character strings extracted from said image;

determine whether a head character of the candidate character string is a space;

when the processor determines that the head character of the candidate character string is not a space, produce the candidate character string as the file name of the image;

when the processor determines that the head character of the candidate character string is a space, accept an input indicating whether the candidate character string is to be used as a file name;

when the processor determines that the candidate character string is to be used as the file name, correct said candidate character string by removing the head character that is a space;

produce the corrected candidate character string as the file name of said image; and when the processor determines that the candidate character string is not to be used as the file name, produce a different character string extracted from the image other than the candidate character string as the file name of the image.

2. The file name producing apparatus according to claim 1, wherein said processor is further configured to correct at least two successive spaces included in said candidate character string when said candidate character string includes said at least the two successive spaces.

3. The file name producing apparatus according to claim 2, wherein said processor is further configured to replace said at least the two successive spaces in said candidate character string with one space.

4. The file name producing apparatus according to claim 2, wherein said processor is further configured to delete all of said at least the two successive spaces in said candidate character string.

5. The file name producing apparatus according to claim 2, wherein said processor is further configured to delete all of the characters subsequent to said at least the two successive spaces except the head character in said candidate character string.

6. The file name producing apparatus according to claim 1, wherein said processor is further configured to correct at least one of a first character string described in a first character type, a second character string described in a second character type different from said first character type, and a space between said first character string and said second character string when said candidate character string includes said first character string, said second character string, and the space between said first character string and said second character string.

7. The file name producing apparatus according to claim 6, wherein said processor is further configured to replace the space between said first character string and said second character string with one space.

8. The file name producing apparatus according to claim 6, wherein said processor is further configured to delete all spaces between said first character string and said second character string.

9. The file name producing apparatus according to claim 6, wherein said processor is further configured to delete all characters preceding the space between said first character string and said second character string.

10. The file name producing apparatus according to claim 6, wherein said processor is further configured to delete all characters subsequent to the space between said first character string and said second character string.

11. A non-transitory computer-readable recording medium storing a file name producing program for producing a file name of an image, said program causing a computer to execute processing comprising the steps of:
a character string selecting step of selecting a candidate character string from character strings extracted from said image, the candidate character string becoming a file name candidate;
a determination step of determining whether a head character of the candidate character string is a space;
a production step of producing, when it is determined that the head character of the candidate character string is not a space, the candidate character string as the file name of the image;
an accepting step of, when it is determined that the head character of the candidate character string is a space, accepting an input indicating whether the candidate character string is to be used as a file name;
a candidate character string correcting step of correcting said candidate character string by removing the head character that is a space when it is determined that the candidate character string is to be used as the file name; and
a file name producing step of producing the corrected candidate character string as the file name of said image, when the input indicates that the candidate character string is to be used as a file name; and producing a different character string extracted from the image other than the candidate character string as the file name of said image when the input indicates that the candidate character string is not to be used as the file name of the image.

12. The non-transitory computer-readable recording medium according to claim 11, wherein the program further causes the computer to correct at least two successive spaces included in said candidate character string when said candidate character string includes said at least the two successive spaces.

13. The non-transitory computer-readable recording medium according to claim 12, wherein the program further causes the computer to replace said at least the two successive spaces in said candidate character string with one space.

14. The non-transitory computer-readable recording medium according to claim 12, wherein said the program further causes the computer to delete all of said at least the two successive spaces in said candidate character string.

15. The non-transitory computer-readable recording medium according to claim 12, wherein said the program further causes the computer to delete all of the characters subsequent to said at least the two successive spaces except the head character in said candidate character string.

16. The non-transitory computer-readable recording medium according to claim 11, wherein said the program further causes the computer to correct at least one of a first character string described in a first character type, a second character string described in a second character type different from said first character type, and a space between said first character string and said second character string when said candidate character string includes said first character string, said second character string, and the space between said first character string and said second character string.

17. The non-transitory computer-readable recording medium according to claim 16, wherein the program further causes the computer to replace the space between said first character string and said second character string with one space.

18. The non-transitory computer-readable recording medium according to claim 16, wherein the program further causes the computer to delete all spaces between said first character string and said second character string.

19. The non-transitory computer-readable recording medium according to claim 16, wherein the program further causes the computer to delete all characters preceding the space between said first character string and said second character string.

20. The non-transitory computer-readable recording medium according to claim 16, wherein the program further causes the computer to delete all characters subsequent to the space between said first character string and said second character string.

21. An image forming apparatus comprising:
a reader that reads an image; and
a processor configured to;
extract one or more character strings from said image;

select a candidate character string from character strings extracted from said image;

determine whether a head character of the candidate character string is a space;

when the processor determines that the head character of the candidate character string is not a space, produce the candidate character string as the file name of the image;

when the processor determines that the head character of the candidate character string is a space, accept an input indicating whether said candidate character string is to be used as a file name;

when the processor determines that the candidate character string is to be used as the file name, correct said candidate character string by removing the head character that is a space;

produce the corrected candidate character string as the file name of said image; and when the processor determines that the candidate character string is not to be used as the file name, produce a different character string extracted from the image other than the candidate character string as the file name of the image.

\* \* \* \* \*